United States Patent [19]

Brooks et al.

[11] 4,282,533
[45] Aug. 4, 1981

[54] PRECISION ORIFICE NOZZLE DEVICES FOR INK JET PRINTING APPARATI AND THE PROCESS FOR THEIR MANUFACTURE

[75] Inventors: Kenneth Brooks, Charlotte, N.C.; Paul R. Smith, Princeton, W. Va.; Thomas E. Morris, Concord, N.C.

[73] Assignee: Celanese Corporation, New York, N.Y.

[21] Appl. No.: 123,629

[22] Filed: Feb. 22, 1980

[51] Int. Cl.³ .................................................. G01D 15/18
[52] U.S. Cl. .................................... 346/75; 346/140 R
[58] Field of Search .............................. 346/75, 140 IJ

[56] References Cited

U.S. PATENT DOCUMENTS

| | | |
|---|---|---|
| 3,210,451 | 10/1965 | Manning, Jr. et al. |
| 3,921,916 | 11/1975 | Bassous .............................. 346/75 X |
| 3,958,255 | 5/1976 | Chiou et al. ........................ 346/75 X |
| 4,106,976 | 8/1978 | Chiou et al. ...................... 346/140 IJ |
| 4,169,008 | 9/1979 | Kurth ................................. 346/75 X |

OTHER PUBLICATIONS

Levanoni, M., Study of Fluid Flow Through Scaled-Up Ink Jet Nozzles, Jan. 1977, IBM Journal of Research and Development, vol. 21, No. 1, pp. 56-68.

*Primary Examiner*—George H. Miller, Jr.
*Attorney, Agent, or Firm*—Robert J. Blanke

[57] ABSTRACT

A single or multi-orifice metal nozzle structure suitable for use in an ink jet printing system. The metallic nozzle member has at least one orifice extending therethrough, the orifice including a cylindrical portion, adjacent the outlet face of said nozzle, having a height ranging from 0.25 to 5 times its diameter and at least one frustoconical section divergent toward the face opposite the outlet face and communicating with the cylindrical portion. Where the metal nozzle is a multi-orifice metal nozzle, each frustoconical section communicates with a groove disposed in the face opposite the outlet face. The multi-orifice metal nozzle is prepared by grooving a metal plate with at least one groove, punching a plurality of frustoconical sections into the groove member and then forming a cylindrical portion into each frustoconical section and through the plate member.

13 Claims, 11 Drawing Figures

PRECISION ORIFICE NOZZLE DEVICES FOR INK JET PRINTING APPARATI AND THE PROCESS FOR THEIR MANUFACTURE

The present invention relates to nozzle devices having one or more orifices suitable for the discharge of ink droplets in ink jet printing apparati.

Ink jet printing has gained wide acceptance due to the ability of ink jet printing devices to put nonimpact generated images onto a surface at very high character speeds. The recent increase in data communications channels and the capabilities to store and process images electronically necessitates the use of equipment for rapidly making images on a receiving surface. The receiving surface may be paper or even food packaging materials such as metal containers, plastic bags and the like.

There are a plurality of approaches to ink jet printing, but all systems use a droplet ejection technique and one or more droplet placement techniques. Of three methods that have been used for droplet formation and ejection, the most widely used is a continuous stream or "synchronous" approach. Ink is pumped through a small nozzle, forming a constant stream of fluid and the nozzle is vibrated using a piezoelectric crystal or the natural Rayleigh frequency to break the stream into independent droplets.

A newer method of droplet ejection is the drop-on-demand technique, which converts an electrical signal to a pressure pulse in an ink chamber, causing a single droplet of ink to be ejected in response to each electrical impulse. Since only one droplet is ejected for each pulse and since this method does not employ resonance, this method produces droplets in any sequence.

A third method of droplet ejection is called "intermittent". The process can be turned on and off, but it takes a few droplets to get started and a few droplets to stop the process. This method employs a high voltage platen behind the receiving surface, toward which an ink droplet in the nozzle would be attracted. Nearer the nozzle is a valving electrode. When this electrode is given the proper charge, the total attractive forces of the platen and the electrode pull the droplet from the nozzle toward the print receiving surface. When the voltage is set oppositely, the droplet stays in the nozzle.

Once the ink drop is in the air, its targeting must be controlled. There are several droplet placement techniques that have been used for this purpose. In most printing systems, several techniques are used together to modulate the drop stream.

A first droplet placement technique is known as electrostatic deflection. Using this droplet placement technique, a droplet is given an electrical charge as it leaves the nozzle. As it flies toward the print receiving surface, it passes between electrically-charged deflection plates. The charge on the droplet causes it to be attracted toward one of the plates and away from the other. These forces "steer" it to the proper position on the print receiving surface.

A second droplet placement technique is known as nozzle movement. Using this technique, the droplets are placed at the proper position by moving the nozzle to the position directly in front of the receiving surface where the droplet is suppose to impinge. The nozzle that moves in both the horizontal and vertical directions has the potential of putting marks anywhere on a receiving surface.

A third droplet placement technique is known as the multinozzle configuration technique. Using the multinozzle configuration with the independent nozzles packed tightly together, droplet placement can be achieved by selecting which nozzles will be used to eject the ink droplet. Configurations of nozzle arrays can be designed and manufactured for controlling either horizontal or vertical placement.

A fourth droplet placement technique is a paper movement technique. Droplet placement can be achieved by moving the paper or print receiving surface to the proper location in relation to the ink jet nozzle.

It should be understood that various combinations of any of the aforementioned droplet ejection and droplet placement techniques can be employed in ink jet printing devices. It can be seen, however, that regardless of the droplet ejection technique or droplet placement technique, all ink jet systems must employ a nozzle device for generation of the ink droplet.

Typically, the nozzles are equipped with extremely small orifices having diameters of from $7\mu$ to $60\mu$ in order to emit the fine jets of ink which break up into small droplets $13\mu$ to $115\mu$ in diameter. The small size of the nozzles and the nozzle orifices makes them difficult to manufacture reproducibly and also makes the identification of sources of variable performance difficult to diagnose.

A plurality of nozzle configurations have been employed in ink jet printing, such nozzles being identified as conical nozzles, cylindrical nozzles, square nozzles and composite nozzles. The conical nozzle consists of a conical section, normally 50° half angle terminated by a circular cylindrical section. Such nozzles are commonly manufactured from watch jewels by a four-step process consisting of (1) cone drilling using conventional high speed drills, (2) orifice drilling using ultrasonic drilling of the cylindrical section, (3) nozzle orifice polishing using thin wires and a polishing slurry, and (4) lapping and polishing of the nozzle face to desired length and finish. The finished jewel nozzle must then be mounted in a bushing before it is suitable for use in an ink jet printing device. The procedure does not yield reproducible results and hence an additional step of optical inspection and selection is normally introduced. Moreover, the final test must be a functional one because optical inspection is incapable of identifying minute imperfections and/or asymmetries giving rise to poor directional performance. Defects commonly encountered in conical nozzles are: varying cone angles, varying orifice sizes of $\pm 2.5\mu$, orifice/cone misregistration, misorientation and surface defects.

The cylindrical nozzle configuration consists of a circular cylindrical shape with a prescribed degree of entrance surrounding. Glass is commonly employed in the fabrication operation which consists of the following steps: (1) glass-tube pulling, using a specially designed furnace; (2) slicing and lapping, using conventional equipment; (3) nozzle polishing, using soft pads for final surface finish and long hair pads for entrance surrounding; and (4) nozzle mounting, using expoxy cement or glassing directly to an adaptor plate. Cylindrical nozzles have been found to be sensitive to the degree of entrance rounding of the nozzle; for instance, sharp entranced nozzles are found to display directional instabilities. Moreover, the long capillary lengths which are inherent in glass nozzles cause a high pressure drop across the orifice which necessitates the use of sophisticated and expensive pumps to deliver the ink supply.

Attempts have also been made to employ square nozzle configurations wherein the interior configuration of the nozzle member is in the form of a truncated pyramid. The lack of a final straight exit section, however, makes this type of nozzle configuration extremely directionally sensitive to any imperfections in its structure.

In order to overcome the noted deficiencies in square nozzle configurations, composite nozzles have been devised such as the nozzles set forth in U.S. Pat. No. 3,958,255. The composite nozzle employs a substrate having a large diameter entrance opening therein which may be in the shape of a truncated pyramid. A membrane overlays the planar substrate and the membrane is then selectively eroded to form a small orifice therein, the membrane preferably being a silicon membrane. While the composite structure overcomes certain notable deficiencies such as directional sensitivity, the composite structure has inherent weaknesses due to the high pressure and velocities to which the nozzles are subjected, the pressures and velocities causing delamination of the membrane portion of the laminate structure. Moreover, the shape meeting angle of the membrane and substrate creates high turbulence in the passage of ink through the composite structure.

While the foregoing discussion has dealt with singular orifice nozzle members, it should be noted that multinozzle configurations are commonly employed in droplet placement techniques since higher character and line speeds can be achieved. As previously noted, such systems employ a plurality of jets in one or more rows, selectively charging drops with a single charge signal for deflection by a constant field to an ink drop catcher. The uncharged drops continue along the original jet stream path to impact a recording surface. The precision control over charging is not required inasmuch as charged drops impact a gutter and not the recording medium. In the absence of selective deflection, the major disadvantage of this type of ink jet printing has been that one nozzle orifice is required for each printing position across the entire dimension of the path to be printed in a single pass. This requires the fabrication of a vast number of nozzle orifices for a single printer. Examples of nozzles designed for this type of printing are Beame et al, U.S. Pat. No. 3,586,907, and Mathis, U.S. Pat. No. 3,701,998. A method for fabrication of orifices with this type of nozzle is shown in Taylor, U.S. Pat. No. 3,655,530, wherein the interior of a plurality of predrilled holes are electroplated until sufficient material has been plated thereon to reduce the orifice diameter to the desired size. This type of fabrication does not, however, lend itself to an extremely closely spaced linear array of orifices.

In order to achieve high quality printing with a multi-orifice array, it is necessary that the ink drops and resultant print drops be sufficiently small and closely spaced so as to be discernible only as a part of the resultant printed symbol and not as individual drops. To achieve this effect with a multiorifice array, it is generally necessary that the orifices be no larger than 50 microns in diameter and be spaced no wider than 250 microns from center to center along a single row. To a certain extent, these results have been obtained by the teachings of U.S. Pat. No. 3,958,255 wherein a multicomponent structure is employed to achieve a multi-orifice nozzle. As previously noted, however, the multi-orifice nozzle of U.S. Pat. No. 3,958,255 is prepared from a silicone membrane which is secured to a substrated having parametric holes disposed therein by cementing the two structures together. In addition to fluid turbulence created by the sharp meeting angle of the two structures, the membrane, which has appropriately disposed orifices etched therein, is subject to being detached by the high ink pressures employed.

In order to overcome the mechanical weakness of the structure, the patentee states that the laminate may be implaced in the reverse direction. However, such a positioning inhibits good fluid flow properties and, moreover, the membrane which has been etched in order to achieve the multiorifice configuration is not a suitable surface for the circuitry which is frequently necessary for drop synchronization. Moreover, it should be noted that nozzles are often subjected to periodic cleaning operations. Preferably, the cleaning operation is an ultrasonic bath cleaning operation which exerts extreme stresses on the jet and hence necessitates a robust metallic design for jets so cleaned.

It is therefore an object of this invention to provide a unitary metallic nozzle member suitable for use in an ink jet printing device wherein the nozzle has high strength, good fluid flow properties, controllable pressure drop across the orifice, and improved directional performance.

It is another object of this invention to provide, in a unitary metallic structure, a plurality of aligned nozzles suitable for use in ink jet printing devices wherein the nozzles have high strength, good fluid flow properties, controllable pressure drop across the orifices, close center to center spacing, and improved directional performance in both the horizontal and vertical plane.

It is still another object of this invention to provide a process for the preparation of unitary metallic nozzle members suitable for use in an ink jet printing device wherein the nozzles are characterized by high strength and improved performance.

In accordance with one aspect of the instant invention, it has now been discovered that an improved nozzle suitable for ink jet printing may be obtained if the orifice portion of a metallic nozzle is of a critical thickness, e.g. desirably less than 1,500 microns and preferably less than about 1,000 microns, if the portion of the orifice adjacent to the outlet side of the nozzle is cylindrical, i.e., generated by a line parallel to the axis, advantageously for a distance ranging from about 0.25 to 5 and preferably from about 0.5 to 3 times the diameter of the outlet, and if the cylindrical portion merges smoothly with a frustoconical section divergent toward the inlet side and meeting the cylindrical portion at a small angle hereinafter referred to as the meeting angle. The meeting angle is twice the angle between the orifice axis and a tangent to the divergent section at a location spaced interiorly of the interior end of the cylindrical portion by a distance equal to 100 percent of the diameter of the cylindrical portion. By so selecting the location at which the meeting angle is measured, account is taken of changes in curvature of the divergent section, as where it is hyperbolic or parabolic. Advantageously, the meeting angle is less than about 60 degrees and preferably less than about 35 degrees. While most commonly the cylindrical portion generated by a line parallel to the axis of the orifice will be circular in cross section, it should be understood that other geometric cross sections are contemplated.

In another aspect of the present invention, a plurality of nozzle members suitably aligned for use in ink jet printing may be obtained by grooving a metal plate member with one or more grooves and then disposing from 1 to 1,000 or more orifices longitudinally along the groove or grooves. The orifices may be spaced from 500μ to 2500μ from each other. When a plurality of grooves are employed, the grooves may be disposed in parallel alignment or may intersect each other. Preferably, the intersecting grooves will intersect at 90 degree angles. The plate member must be of sufficient thickness to prevent warping and therefore thicknesses of from 500 to 5000 microns and preferably from 750 to 5000 microns are employed. The thickness of the plate is then reduced to dimensions suitable for nozzle orifices by grooving. The grooves are preferably V-shaped although other geometric shapes may be employed. The depth of the groove should be such that the deepest part of the groove is within 25μ to 250μ of the opposite face of the plate. The grooves themselves, when in parallel alignment, may be positioned, measured from groove center to groove center, a distance of up to 200μ of each other. The orifices themselves are constructed according to those configurations previously set forth for the single nozzle members. However, a meeting angle of less than about 60 degrees and preferably less than about 35 degrees must be maintained between the cylindrical section and the adjacent conical section to prevent turbulent flow of ink through the nozzle.

The sequence in which the sections are formed in the metal is from largest diameter to smallest diameter. In this manner the most pointed, weakest tools need operate upon a minimum thickness of metal. Thus, for example, a conical punch of wide angle, e.g., about 30° to 100° and preferably about 50° to 60°, is pressed into the metal. A narrower angle punch is then pressed into the metal to the requisite distance so that a subsequently produced cylindrical section will be of the desired height. It will be noted that by proceeding in this manner each depression serves as a seat to ensure proper positioning of the tool for producing the next depression. This technique is applicable even for orifices with relatively wide meeting angles; advantageously the difference between the meeting angles of successive conical sections is at least about 20°, although close spacing of holes may sometimes render it impractical to observe this preference.

If desired, two or more of these steps may be performed simultaneously by employing a suitably profiled tool, e.g., a tool having a frustoconical portion surmounted by a smaller angle conical portion and/or a cylindrical portion. In place of two portions which are straight sided, such as cones, there may be substituted for either or for both, individually or jointly, a curved portion having, for example, a hyperbolic or parabolic profile. It will be appreciated that where two or more portions are included on a single tool, the leading portion necessarily will have to penetrate a greater thickness of metal than when individual tools are employed with the tools applied in sequence starting with the widest.

As previously noted, the orifice of the apparatus of this invention may be other than circular in cross section. Cross sections such as, for instance, triangles and quadralaterals may be employed. Rectangles are preferred among the quadralateral cross sections. However, regardless of the cross section of the orifice, the total cross sectional area should be in the range of $125\mu^2$ to $3000\mu^2$. While these dimensions are normally obtained by drilling and/or punching operations, the cross sectional area of the orifice may also be changed or modified by electroplating with chromium.

It should be understood that the process sequence employed is largely determined by the hardness of the metal being processed. For purposes of this invention, steel, nickel and tantalum are preferred metals. For instance, if stainless steel is being employed, it is preferred that the punching operation be followed by a drilling operation in order to obtain the cylindrical portion. Where nickel is being processed, it is preferred that the entire operation be a punching operation. However, the cylindrical portion may be either punched or drilled. When tantalum is being processed, it is preferred that the entire operation be a punching operation. Regardless of whether the cylindrical portion is punched or drilled, the final process step is the removal of the burr at the exit portion. The initial process step in the preparation of a multi-orifice nozzle is, of course, the grooving of the plate member.

A better understanding of the instant invention may be had from a discussion of the drawings wherein.

Figure 1:
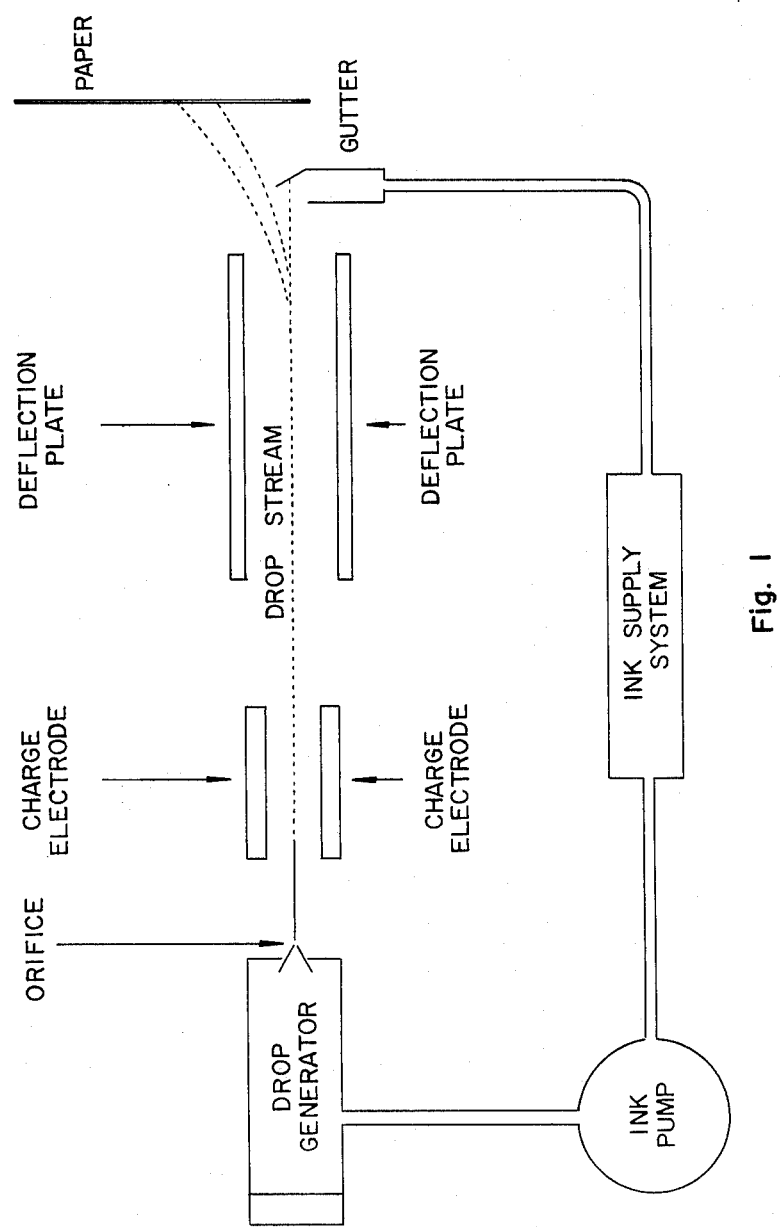
FIG. 1 is a schematic illustration of one form of ink jet printing apparatus.

Turning to FIG. 1 of the drawings, conductive ink under pressure is forced through a small nozzle to form a flow stream. The flow stream would normally break up into drops of quasi-random size and spacing. The drop formation can be controlled by vibrating the ink within the nozzle cavity at a fixed ultrasonic frequency. The pressure waves cause the flow stream to break up into a stream of drops of uniform size and spacing at a well defined distance from the nozzle. A voltage applied at a charge electrode surrounding the breakup point induces an electrical charge of a specific predetermined magnitude on the forming drop. This charge is retained by the drop throughout its flight to the recording surface. The stream of drops passes through an electrostatic field formed by a fixed high voltage across a pair of deflection plates. Because the charge on each drop is controlled individually, a drop can be deflected vertically a desired amount. If, in forming a character, a particular space in a scan is to be left white, it is blanked by leaving the drops uncharged. These undeflected drops are intercepted by a gutter and recycled to the ink reservoir. As drops are deflected vertically, the printhead is driven horizontally at constant speed. Thus, drops are deposited in appropriate positions within a raster area to form the desired character.

Figure 2:
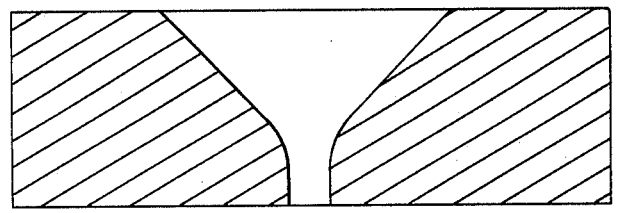
FIG. 2 is a cross-sectional view of a prior art conical nozzle.
Figure 3:
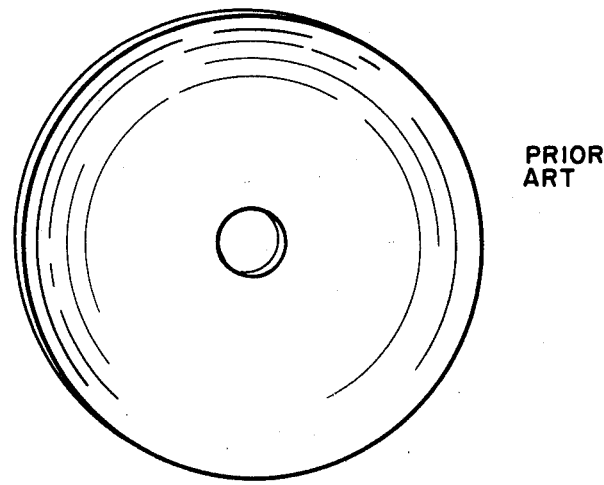
FIG. 3 is a projected view of a prior art cylindrical nozzle.
Figure 4:
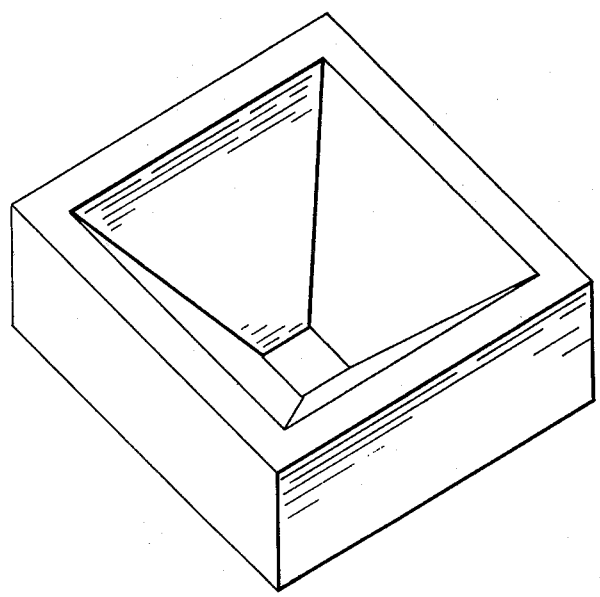
FIG. 4 is a projected view of a square nozzle.

Although the apparatus as set forth in FIG. 1 is only one form of a plurality of ink jet printing devices, the ink jet printing apparatus of FIG. 1, as well as all other ink jet printing devices, employ one or more nozzle members. The nozzle members of the prior art may be found in a wide variety of designs, such as for instance the jeweled conical nozzle of FIG. 2, the orifice of which has been lapped to provide a smooth surface free of sharp meeting angles, the glass cylindrical nozzle of FIG. 3 and the truncated pyramid nozzle of FIG. 4. All of these prior art nozzles, in addition to being difficult to fabricate, frequently fragile and in some instances exhibiting high fluid turbulence properties, are lacking in orifice-to-orifice fidelity; that is to say, when a plurality of nozzle members are employed, the lack of orifice fidelity results in varying ink drop size, varying ink flow rates, varying drop wavelengths and varying degrees of difficulties in obtaining horizontal and/or vertical parallel alignment of the stream of drops issuing from the individual nozzle orifices.

Figure 5:
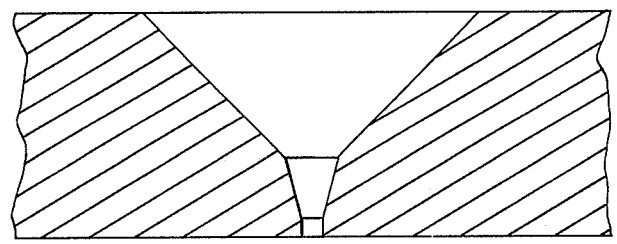
FIG. 5 is a cross-sectional view of a single orifice nozzle of the instant invention.

The nozzle of the instant invention, however, as illustrated by FIG. 5 of the drawings, is not only less difficult to fabricate but has a high degree of orifice-to-orifice fidelity.

Figure 6:
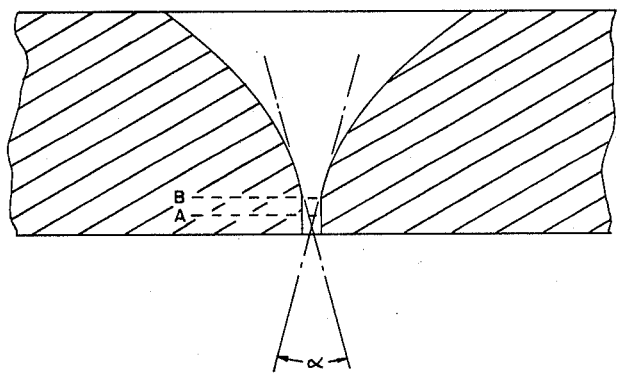
FIGS. 6 and 7 are sectional views showing how to determine the meeting angle for countersinks which are not conical.
Figure 7:
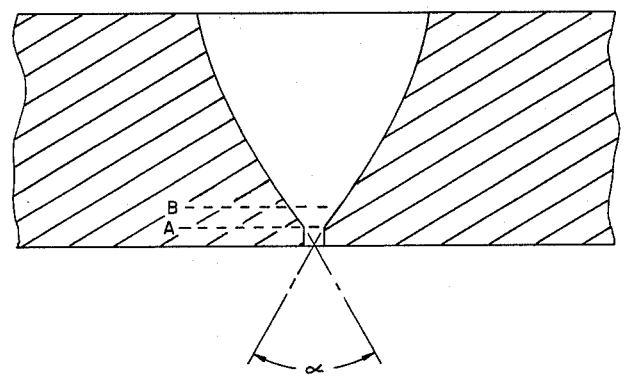

As previously noted, however, it is essential that the meeting angle between the cylindrical portion of the orifice of the nozzle of the instant invention and the conical section of the orifice of the instant invention be less than about 60 degrees and preferably less than about 35 degrees. The angle, as previously defined, is easily determined where the walls of the conical section are straight. Where, however, the walls of the conical section are either convex or concave, the meeting angle may be measured as illustrated in FIGS. 6 and 7 of the drawing. As can be seen, the elevation A, at which the orifices cease to be cylindrical, is marked. The width of the orifice at elevation A is determined and 100 percent of this width is marked above A as plane B, perpendicular to the axes of the orifice. Tangents are drawn to the two points where B intersects the outline of the orifice and the meeting angle alpha is the angle between these tangents.

Figure 8:
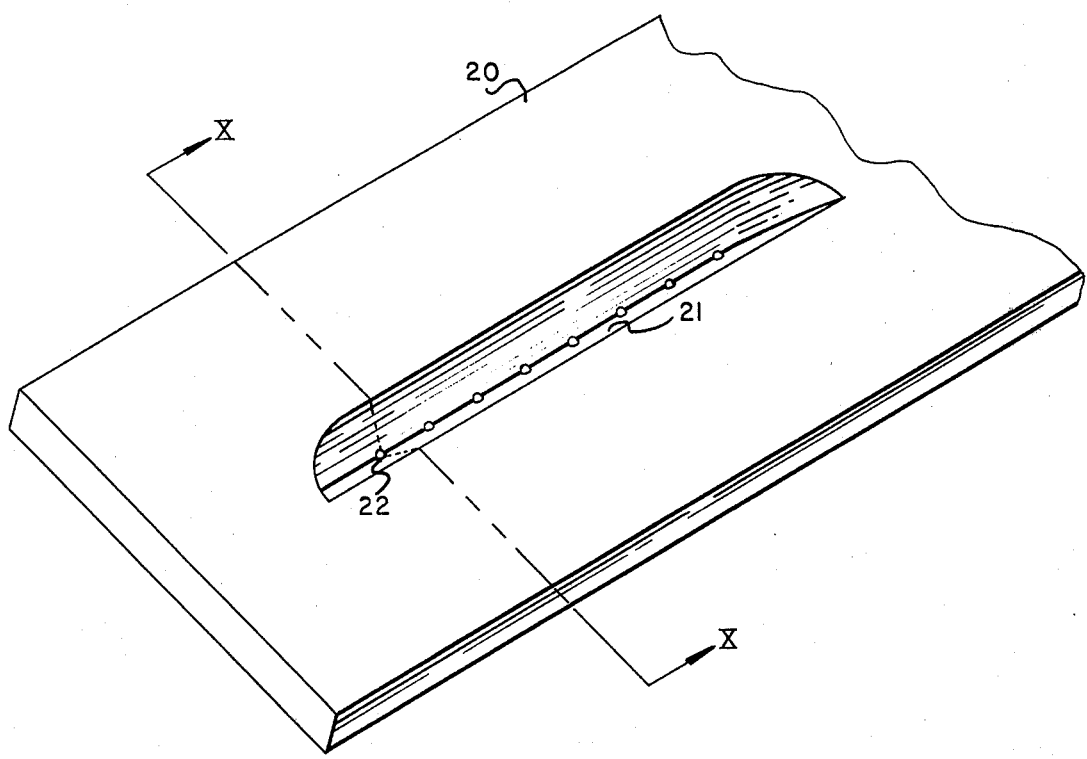
FIG. 8 is a partially broken projected view of longitudinally aligned plural orifice nozzle of the instant invention.
Figure 10:
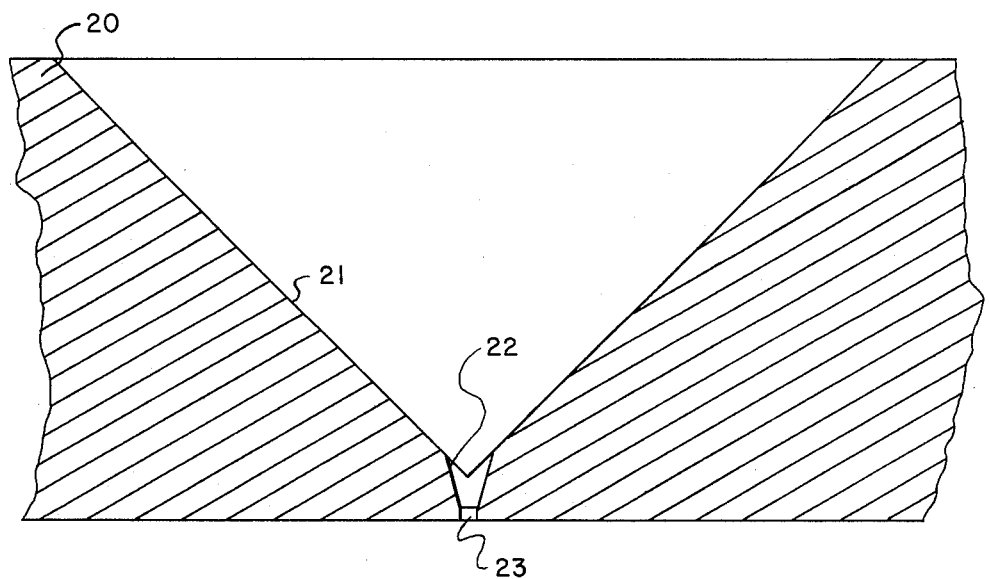
FIG. 10 is a not-to-scale partially broken cross-sectional view taken along the line X, X of FIG. 8 of the drawings.

In FIG. 8 there is shown as a projected view, a longitudinally aligned plural orifice nozzle of the instant invention wherein a plate member 20 having a thickness great enough so as to retain its dimensional rigidity but too thick to be appropriate for an ink jet nozzle has a V-shaped groove member 21 disposed therein. Conical apertures 22 are formed by punching a conical countersink to the desired depth in groove member 21. The apex of groove member 21 serves as a guide for the more pointed countersink employed in punching conical members 22. A cross section of FIG. 8 taken along the line X, X illustrates, in FIG. 10, a cross section of one form of the multiorifice nozzle of the instant invention. As can be seen, groove member 21 has a conical portion 22 punched therein. Conical portion 22 then has cylindrical portion 23 drilled or punched, depending upon the metallic nature of plate member 20.

Figure 9:
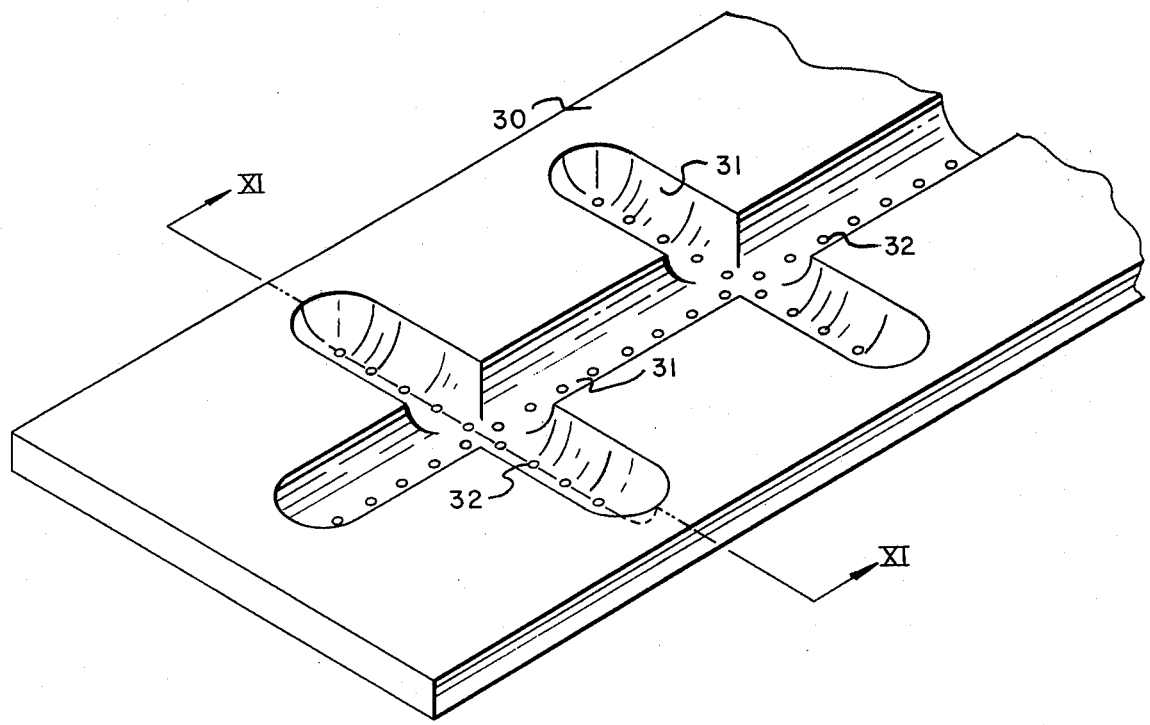
FIG. 9 is a partially broken projected view of a longitudinally and horizontally aligned plural orifice nozzle of the instant invention.

As can be seen in FIG. 9 of the drawings, the groove or grooves 31 may have curved walls rather than the V-shaped configuration as set forth in FIG. 8 of the drawings. Moreover, the groove members 31 may intersect each other at right angles whereby the conical members 32 disposed therein are horizontally and vertically aligned. In any event, however, plate member 30 is of sufficient depth to have structural rigidity, that depth being greater than the desirable depth for the formulation of a nozzle suitable for ink jet printing, the desired depth being obtained by grooving plate member 30 with trough members 31.

Figure 11:
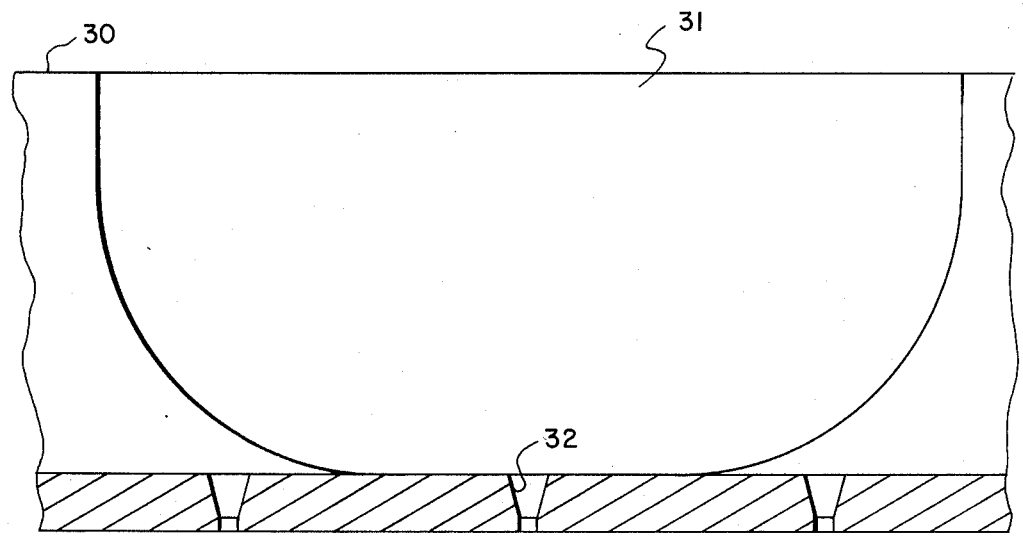
FIG. 11 is a not-to-scale partially broken cross-sectional view taken along the line XI, XI of FIG. 9 of the drawings.

As can be seen in FIG. 11 of the drawings, the groove members 31 intersect at right angles, the groove members 31 having disposed therein a plurality of spaced orifices comprising conical portions and cylindrical portions.

As previously noted, it is essential that the orifices employed in the nozzles of the instant invention be devoid of sharp meeting angles, particularly in the area where the conical portion joints the cylindrical portion. Where sharp meeting angles are present, that is to say, angles in excess of 75 degrees, turbulence is produced in the fluid flow of the ink. The turbulence results in non-uniform ink drop size and, in extreme cases, the generation of large drops accompanied by smaller satellite drops, all of which are generated at random spacing intervals. It is also essential that the cylindrical portion of the orifice have a height of no more than 5 times the diameter of the orifice outlet. If this maximum height limitation is exceeded, high fluid pressure drops will result and special fluid pumps must be employed. When, however, all of the critical parameters of the nozzles of the instant invention are met, turbulence free fluid flow is obtained and ink drops of uniform size and spacing are obtained.

Having thus disclosed the invention, what is claimed is:

1. In an ink jet printing system of the type wherein ink is delivered to a nozzle member and caused to break into droplets after issuing from the nozzle, a charging electrode is positioned in the region in which the ink jet breaks into droplets and the charging electrode is adapted to respond to data signals selectively to charge the droplets as they are formed, the improvement comprising: a metallic nozzle member less than about 1000 microns thick provided with an orifice extending therethrough, said orifice including a cylindrical portion adjacent the outlet face of said nozzle having a height ranging from about 0.25 to 5 times its diameter and at least one frustoconical section divergent toward the face opposite said outlet face and communicating with said cylindrical portion, said frustoconical section and said cylindrical portion having a meeting angle of less than about 60 degrees.

2. The apparatus of claim 1 wherein said metallic nozzle member is electroplated with chromium.

3. The apparatus of claim 1 wherein said metallic nozzle is fabricated from a metal selected from the group consisting of nickel, tantalum and steel.

4. In a multi-orifice fluid jet head suitable for ink jet printing including a source of pressurized fluid, and manifold means communicating with said source, the improvement comprising: a multi-orifice metallic nozzle communicating with said manifold means and comprising a plate member having at least one straight groove member disposed therein, said groove having a linear array of spaced orifices positioned within said groove member, each of said orifices including a cylindrical portion adjacent the outlet face of said plate, said cylindrical portion having a height ranging from about 0.25 to 5 times its diameter and a frustoconical section divergent toward said straight groove member and communicating with said cylindrical portion, said frustoconical section and said cylindrical portion having a meeting angle of less than about 60 degrees.

5. The apparatus of claim 4 wherein said frustoconical portion has a height ranging from 5 to 30 percent of the thickness of said nozzle.

6. The apparatus of claim 4 wherein said metallic nozzle is fabricated from a metal selected from the group consisting of nickel, tantalum and steel.

7. The apparatus of claim 4 wherein said groove member is a V-shaped groove member.

8. The apparatus of claim 4 having groove members which intersect at right angles, said groove members having a linear array of approximately equally spaced orifices positioned therein.

9. The apparatus of claim 4 having parallel groove members, said groove members having a linear array of approximately equally spaced orifices positioned therein.

10. The apparatus of claim 4 wherein said equally spaced orifices are spaced from 500 microns to 2500 microns from each other.

11. The apparatus of claim 4 wherein said multi-orifice fluid jet head is electroplated with a metal selected from the group consisting of chromium and nickel.

12. The apparatus of claim 4 wherein said plate member has a thickness of from 500 microns to 5000 microns.

13. The apparatus of claim 4 wherein said orifice is circular, quadralateral or triangular in cross section.

* * * * *